E. HOPKINS.
Hand-Seeder.
No. 14,767.
Patented Apr. 29, 1856.
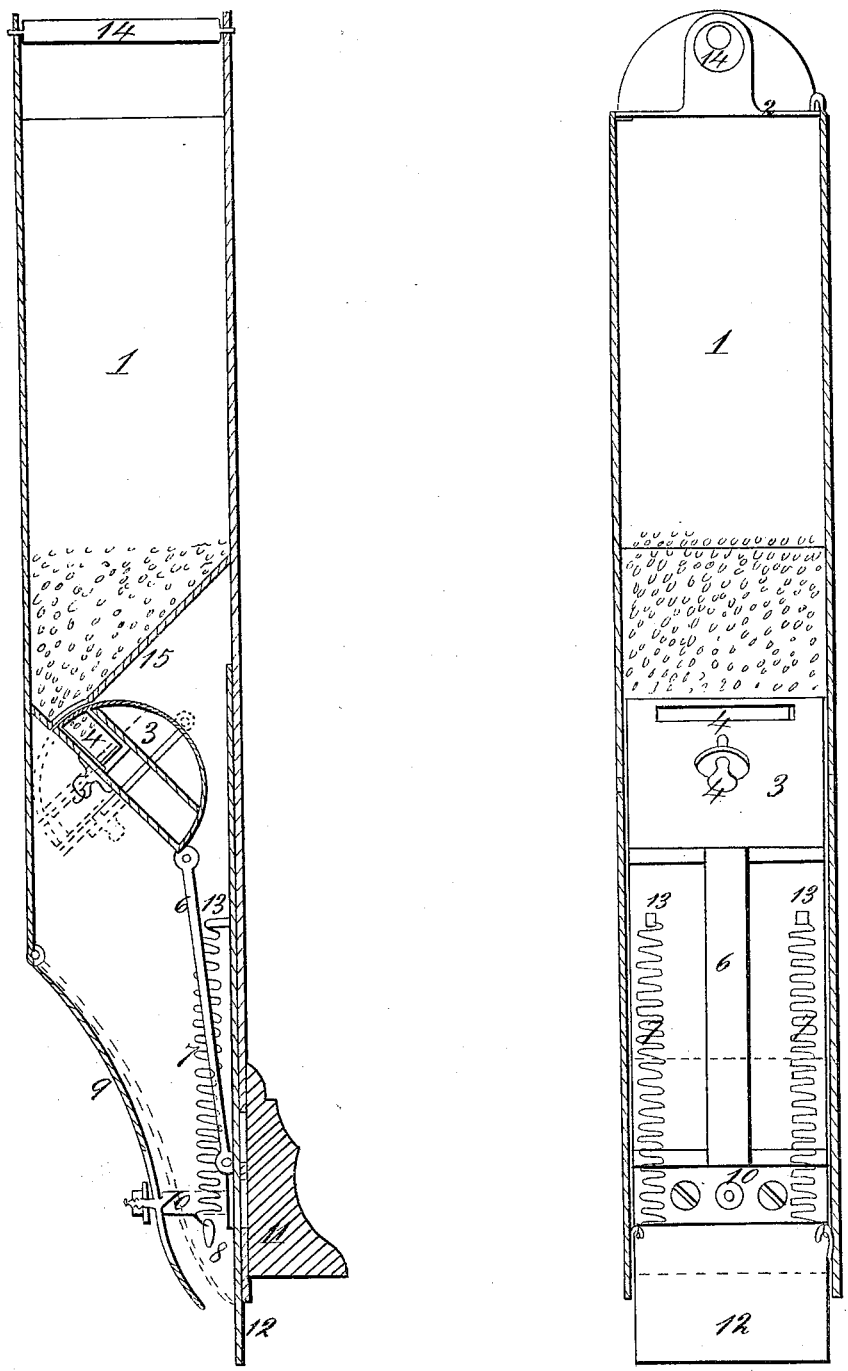

UNITED STATES PATENT OFFICE.

EDWARD HOPKINS, OF CINCINNATI, OHIO.

IMPROVEMENT IN HAND SEED-PLANTERS.

Specification forming part of Letters Patent No. 14,767, dated April 29, 1856.

*To all whom it may concern:*

Be it known that I, EDWARD HOPKINS, of the city of Cincinnati, in the county of Hamilton and State of Ohio, have invented certain new and useful Improvements in Hand Seed-Planters; and I do hereby declare that the following is a full and exact description thereof, reference being had to the accompanying drawings, forming part of this specification, and to the figures of reference marked thereon.

Similar figures refer to like parts.

The nature of my improvement consists in the arrangement of mechanism for working the feed-box for discharging the corn from the case.

Figure A represents a longitudinal sectional elevation of the planter. Fig. B is a similar view at right angles with Fig. A.

1 represents the case for containing the seed.

2 is the lid for admitting the seed to the case, and 3 is a semicircular cylinder, made to turn on an axis, and is provided with an adjustable vessel, 4, on its inside, as represented in Fig. A. This vessel is set near the edge of the cylinder 3 when but few seed are required to be planted at a time, and when a greater number are desired to be dropped the receiving-vessel is set in toward the center, thereby enabling the operator to drop few or many seed at a time, as the case may demand.

The machine is represented in a position ready to be inserted in the ground by taking hold of the handle 14 and forcing the end of the sliding plate 12 into the ground, which sinks until the catch-block 11 strikes the surface, which block is attached to the plate 12 by a slot cut through the side of the case, and by the resistance that the surface of the ground gives to the catch-block 11 it thereby revolves the semicircular cylinder downward by means of the rod 6, which is connected to the sliding plate 12 at one end and to the cylinder at the other, as shown in Fig. A, and at the same time the hinged lid 9 is drawn close down to the case by a pin, 10, passing through a slot cut in the lid. Said pin is provided with a washer and nut, and the washer works on the angling outside part of the lid and draws it to the case (when inserted in the ground) for excluding the dirt from the inside of the case and catching the seed that falls from the cylinder and holding them until the machine has been inserted sufficiently far, after which it is withdrawn, and at the same instant the lid opens and drops the seed, which are covered by the dirt falling over them through the angular motion given to the machine as it is drawn from the earth.

The machine resets itself again in its different parts by means of the spiral spring 7 7, one end of which is attached to the side of the case and the other end to the plate 12, and which pulls the plate 12 down and throws up the semicircular cylinder 3 for receiving another charge of seed in the adjustable vessel 4. This vessel is made adjustable by the screw 5, which works in a slotted opening on the lower part of the cylinder.

What I claim as my improvement, and desire to secure by Letters Patent, is—

The arrangement of the rod 6 and spring 7, combined with the catch-block 11 and sliding plate 12, for operating the semicircular cylinder 3 and lid 9, for purposes substantially set forth in the foregoing specification.

EDWARD HOPKINS.

Witnesses:
MARTIN BENSON,
L. W. SMITH.